United States Patent
Kuipers et al.

Patent Number: 6,045,949
Date of Patent: Apr. 4, 2000

[54] APPARATUS FOR IMPROVING THE COMPRESSION UNIFORMITY OF A CELL STACK IN A BATTERY

[75] Inventors: Roy Kuipers, Rockwell; Patrick Kwok-Yeung Ng, Plano, both of Tex.

[73] Assignee: Lucent Technologies, Inc., Murray Hill, N.J.

[21] Appl. No.: 09/118,186

[22] Filed: Jul. 17, 1998

[51] Int. Cl.[7] .................................................. H01M 4/72
[52] U.S. Cl. ..................... 429/233; 429/241; 429/147; 429/163; 29/2
[58] Field of Search .................................. 429/233, 241, 429/242, 147, 163, 176; 29/2

[56] References Cited

U.S. PATENT DOCUMENTS

| | | | |
|---|---|---|---|
| 4,982,482 | 1/1991 | Wheadon et al. | 29/2 |
| 5,384,212 | 1/1995 | Heiman et al. | 429/143 |

*Primary Examiner*—Maria Nuzzolillo
*Assistant Examiner*—Angela J. Martin
*Attorney, Agent, or Firm*—Locke Liddell & Sapp LLP

[57] ABSTRACT

A battery grid has a thickness which is greater at the top than at the bottom to achieve a uniform compressive force on a grid stack exerted by the side walls of a battery container.

A plastic wedge is disposed between the side walls of the battery container and the stack of grids to improve the distribution of compressive forces.

5 Claims, 2 Drawing Sheets

APPARATUS FOR IMPROVING THE COMPRESSION UNIFORMITY OF A CELL STACK IN A BATTERY

TECHNICAL FIELD OF THE INVENTION

The present invention relates to batteries, and more particularly to a grid configuration and apparatus for improving the compression uniformity of a cell stack in a battery container.

BACKGROUND OF THE INVENTION

In the design of a battery, one factor that influences the performance of a battery is the compression pressure on the separators between the positive and negative electrode plates. If insufficient pressure is applied, detachment of the separator can occur and cause a decrease in performance. High compression, however, can lead to insufficient amount of absorbed electrolyte and can have the same detrimental effect.

A plurality of electrode plates is referred to as a cell stack. A cell stack is contained in a battery container or "jar". A jar is usually a molded part, made from plastic which is resistant to the electrolyte. For easy release of the mold, the inside of the jar is designed with a taper, being wider at the top and narrower at the bottom. This tapered design can lead to a non-uniform distribution of compression pressure on the stack, being low at the top and high at the bottom. As a result, because of this non-uniform distribution, the top of the cell stack is prone to detachment.

A need has thus arisen for a grid design for battery plates and an apparatus for providing a uniform compression pressure over the entire height of the battery cell stack.

SUMMARY OF THE INVENTION

In accordance with the present invention, a battery grid is provided. The grid has a thickness which is greater at the top than at the bottom to achieve a uniform compressive force on a grid stack exerted by the side walls of a battery container.

In accordance with another aspect of the present invention, a plastic wedge is provided which is inserted between the side wall of the battery container and the stack of grids to improve the distribution of compressive forces.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
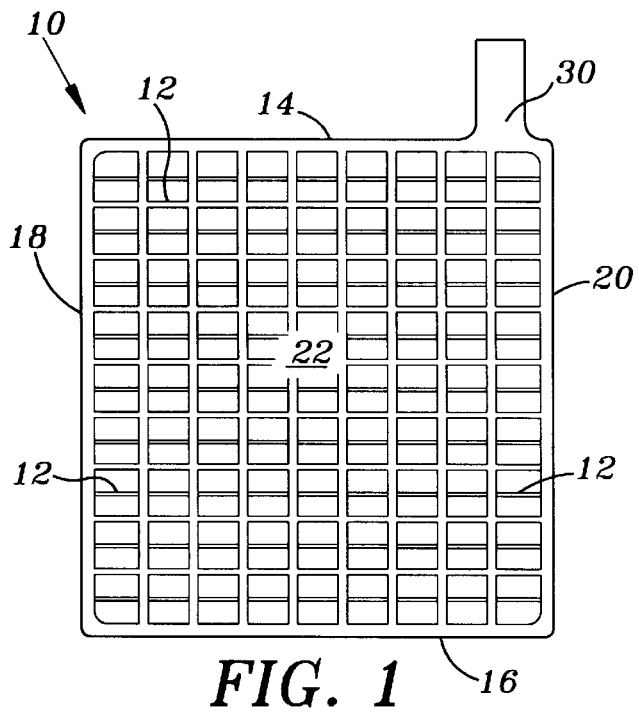
FIG. 1 is a front elevational view of a grid in accordance with an embodiment of the present invention.
Figure 2:
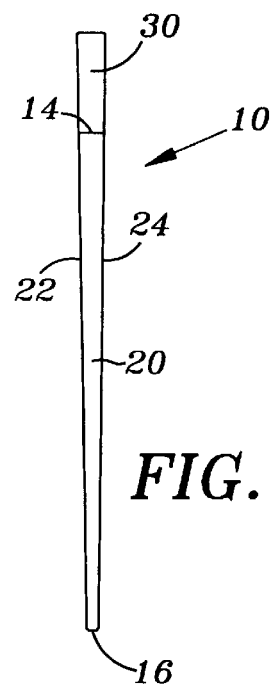
FIG. 2 is a side elevational view of the grid of FIG. 1.

Referring simultaneously to FIGS. 1 and 2, the present battery grid is illustrated, and is generally identified by the numeral 10. Grid 10 is fabricated from a lead or lead alloy plate, and includes a plurality of apertures 12. Apertures 12 shown in FIG. 1 are for illustrative purposes only, various aperture sizes and patterns can be utilized with the present grid 10, and do not form part of the present invention. Grid 10 includes a top 14, bottom 16, sides 18 and 20, and front and rear surfaces 22 and 24. Extending from top 14 of grid 10 is a terminal 30.

An important aspect of the present invention is the variable thickness of grid 10. The thickness of grid 10 between surfaces 22 and 24 at top 14 of grid 10 is greater than the thickness at the bottom 16. The change in thickness from bottom 16 to top 14 of grid 10 is continuous, resulting in surfaces 22 and 24 having a angular taper, the degree of taper is determined based upon the battery jar taper, and may have a value, for example, of about 3°.

Figure 3:
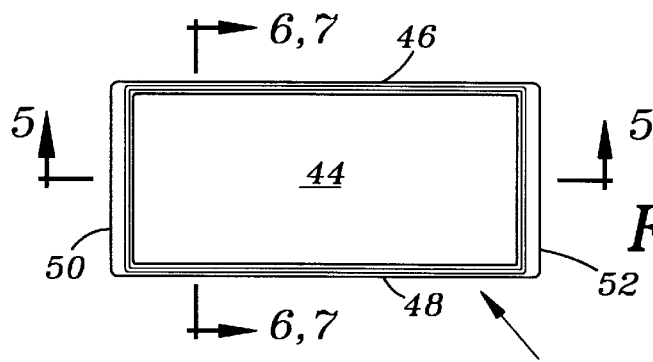
FIG. 3 is a top plan view of a battery container for use with the present grid.
Figure 4:
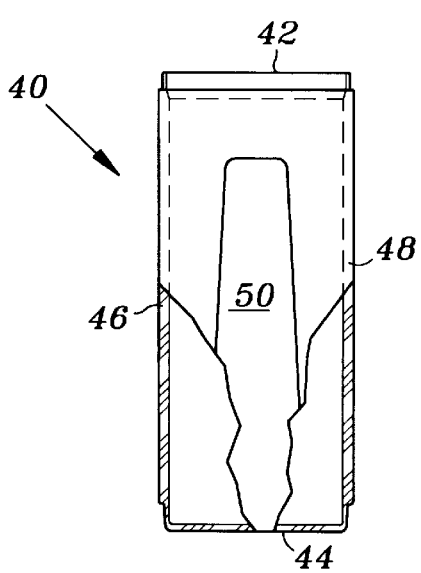
FIG. 4 is a side elevational view of the battery container shown in FIG. 3.
Figure 5:
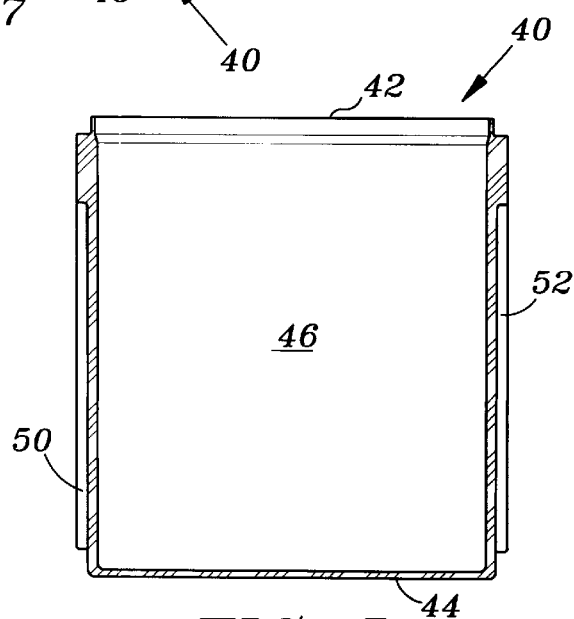
FIG. 5 is a cross-sectional view taken generally along sectional lines 5—5 of FIG. 3.

Referring now to FIGS. 3, 4, and 5, a typical battery jar 40 is illustrated. Battery jar 40 has a top 42, bottom 44, side walls 46 and 48, and end walls 50 and 52. Side walls 46 and 48 are tapered such that the distance between side walls 46 and 48 at top 42 is greater than the distance between side walls 46 and 48 at bottom 44. Sides 46 and 48 are inwardly tapered due to molding constraints of jar 40. Jar 40 is commonly made of plastic material that is resistant to acid and heat, such as polypropylene, PVC, ABS, and polycarbonate.

Figure 6:
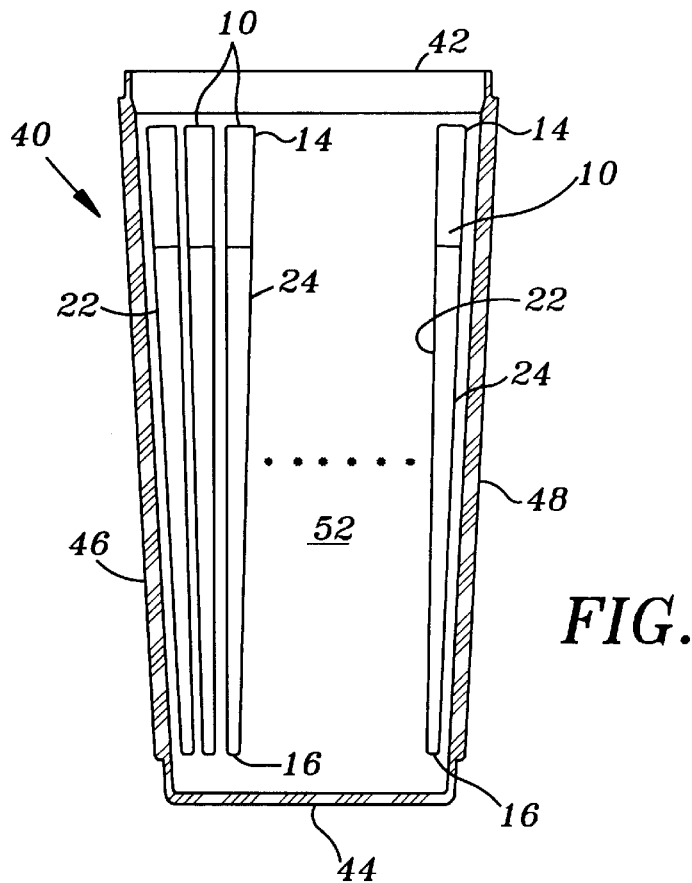
FIG. 6 is an enlarged cross-sectional view taken generally along sectional lines 6—6 of FIG. 3 of a battery container and including the present grid of FIGS. 1 and 2.

Referring now to FIG. 6, a plurality of grids 10 are stacked side-by-side in jar 40 and form a grid stack. Separators (not shown) are disposed between grids 10. Since the tops 14 of grids 10 are wider than the bottoms 16, the lateral compressive forces exerted by sidewalls 46 and 48 on grids 10 are uniformly distributed over surfaces 22 and 24 throughout the entire height of grid 10. A further advantage of the present invention occurring because of the increased thickness of top 14 of grid 10 is an increased current carrying capacity at the top 14 of grid 10 in the area of terminal 30. With this enhanced current flow, there is an enhanced voltage distribution over the entire height of grid 10.

Figure 7:
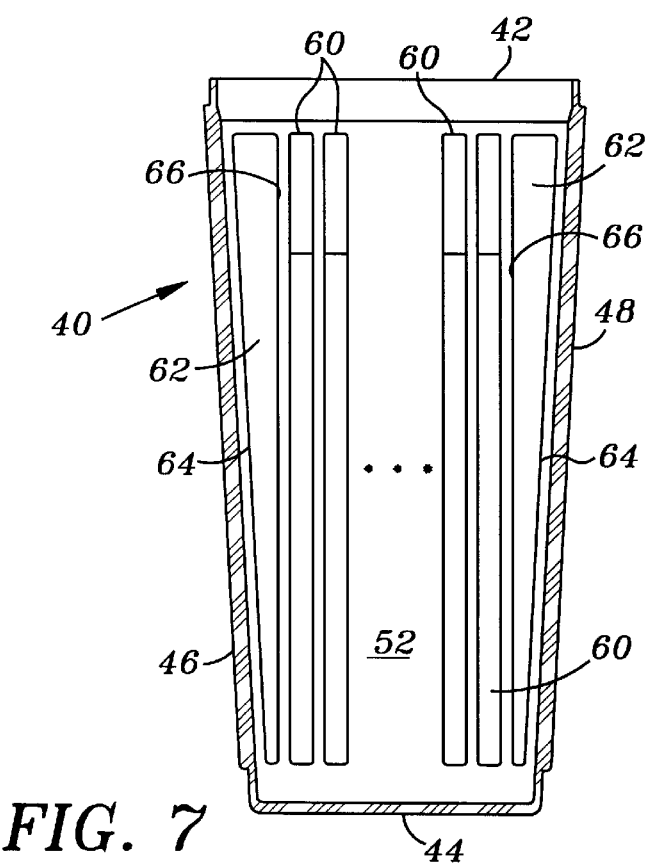
FIG. 7 is an enlarged cross-sectional view taken generally along sectional lines 7—7 of FIG. 3 of a battery container and including an additional embodiment of the present invention illustrating the use of the present wedge.

Referring now to FIG. 7, an additional embodiment of the present invention illustrated. Grids 60 having a uniform thickness are stacked side-by-side within jar 40. Disposed adjacent to grids 60 and side walls 46 and 48 of jar 40 are wedges 62. Wedges 62 each have a tapered surface 64 disposed adjacent side walls 46 and 48 which match the taper of side walls 46 and 48. The opposite surface 66 of wedges 62 are linear, and uniformly compress grids 60 along the entire surface of grid 60. Wedges 62 improve the distribution of compressive forces generated by side walls 46 and 48 of jar 40 on the stack of grids 60. Wedge 66 may be fabricated of plastic material similar to that used for the manufacture of jar 40.

It therefore can be seen that the present invention provides for a more uniform compression pressure over the height of a grid stack of a battery. Either through the use of a variable thickness grid or a wedge, uniform compression over the surface of a grid stack is achieved.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A battery grid comprising:

a plate having a plurality of apertures, said plate having a top, bottom, sides, front and rear surfaces, and a thickness between said front and rear surfaces, said thickness at said plate top being greater than said thickness at said plate bottom, said front surface being substantially uniformly tapered from said plate top to said plate bottom and said rear surface being substantially uniformly tapered from said plate top to said plate bottom.

2. The grid of claim 1 wherein said thickness continuously increases from said plate bottom to said plate top.

3. A battery comprising:

a container having a top, bottom, first and second side walls, and end walls, said side walls being substantially uniformly tapered inwardly from said container top to said container bottom;

a plurality of battery grids disposed in said container, each of said grids having a top, bottom, sides, front and rear surfaces, and a thickness between said front and rear surface, said front surface being substantially uniformly tapered from said grid top to said grid bottom and said rear surface being substantially uniformly tapered from said grid top to said grid bottom;

said front surfaces of said grids being disposed opposite said container first side wall and said rear surfaces of said grids being disposed opposite said container second side wall; and said thickness of said tops of said grids being greater than said thickness of said bottoms of said grids, such that said container side walls exert a uniform compressive force on said front and rear surfaces of said grids.

4. The battery of claim 3 wherein said grid thicknesses continuously increase from said grid bottom to said grid top.

5. A battery comprising:

a container having a top, bottom, first and second side walls, and end walls, said side walls being substantially uniformly tapered inwardly from said container top to said container bottom;

a plurality of battery grids disposed in said container, each of said grids having a top, bottom, sides, front and rear surfaces, and a uniform thickness from said grid top to said grid bottom; and a first wedge disposed adjacent said container first side wall and a second wedge disposes adjacent said container second side wall, said wedges extending from said container top to said container bottom, each wedge having a first surface having a taper disposed adjacent to one of said container side walls and a second planar surface disposed adjacent to one of said surfaces of one of said plurality of battery grids for exerting a uniform compressive force on said plurality of battery grids.

* * * * *